C. F. BROWN.
WHEEL FOR GUN CARRIAGES, &c.
No. 29,055.            Patented July 10, 1860.
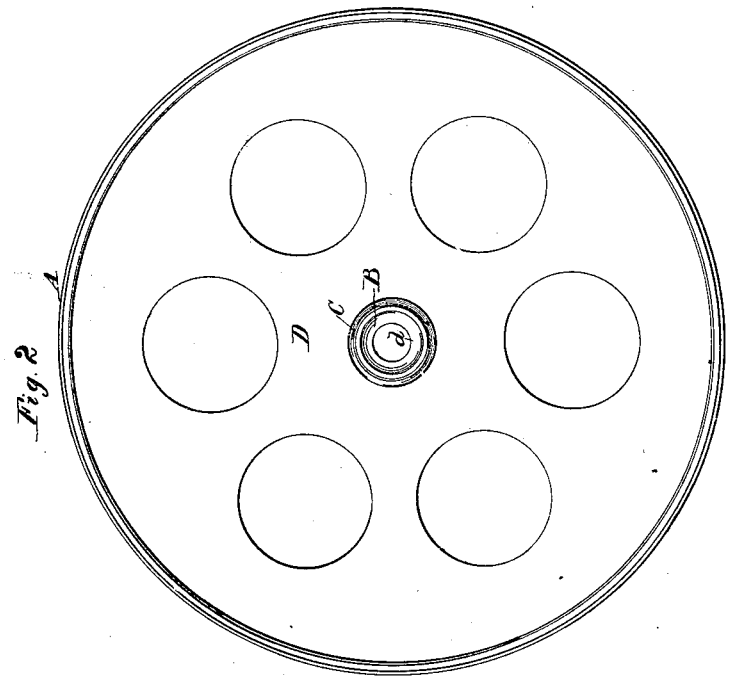
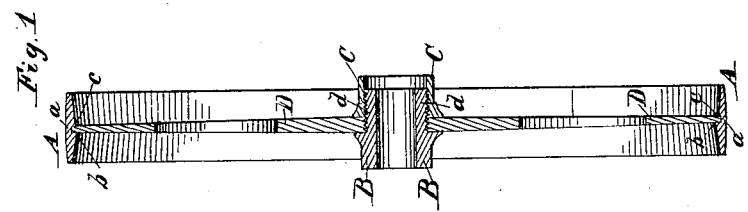
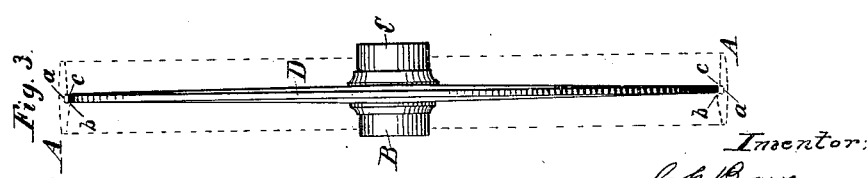

UNITED STATES PATENT OFFICE.

CHARLES F. BROWN, OF WARREN, RHODE ISLAND.

WHEEL FOR GUN-CARRIAGES, &c.

Specification of Letters Patent No. 29,055, dated July 10, 1860.

*To all whom it may concern:*

Be it known that I, CHARLES F. BROWN, of Warren, in the county of Bristol and State of Rhode Island, have invented a new and useful Improvement in Wheels for Gun-Carriages and other Vehicles; and I do hereby declare that the following is a full, clear, and exact description of the same, reference being had to the accompanying drawings, forming part of this specification, in which—

Figure 1, is a central section of a wheel constructed according to my invention. Fig. 2 is a side view of the same. Fig. 3 is a sectional view illustrating the manner in which the parts are put together.

Similar letters of reference indicate corresponding parts in the several figures.

A, is the rim made of a single piece.

B, C, is the hub made in two pieces and D, is a single plate which unites the hub and the rim. The plate D, is made thicker in the center than at the edges and its turned up perfectly true and bored out centrally, and has a screw thread cut in its central bore to enable the inner piece B, of the hub to which the axle is fitted to be screwed into it. This portion of the hub fits up to the plate with a shoulder. The other piece C, of the hub consists simply of an internally screwed band which screws on to the protruding screwed portion $d$, $d$, of the piece B, and up to the plate which is thus clamped between the two pieces.

The rim A, has a groove $a$, turned in its interior at about the middle of its width to receive the margin of the plate D, and of such depth that when the rim and plate are of the same temperature the plate fills the said groove perfectly as shown in the section Fig. 1. The rim is put on by making it hot enough to expand sufficiently for the plate to enter the groove and allowing to shrink upon the plate.

To provide for the easy application of the rim to the plate the former is made with a greater thickness of metal on one side $b$, $b$, of the groove as shown in Figs. 1 and 2, than on the other side $c$, $c$, the thickness on the side $c$, $c$, being just sufficient to allow the plate to pass the edges of the groove on that side when the rim is expanded by heat and the plate is cold as shown in Fig. 3. The edges of the rim may be both of the same thickness. By making the metal thicker on the side $b$, $b$, of the groove that side forms a bearing to lay the plate upon when the rim is expanded so that as the rim shrinks, the plate will not fail to enter the groove $a$, properly, and this constitutes the most important feature of my invention. The plate is more easily inserted in the rim in a horizontal position. The wheel constructed in this way has the character of a solid wheel.

I prefer to make the whole wheel of wrought iron but the whole hub or the portion B, may be made of cast iron.

I do not claim the shrinking of the rim of an iron wheel on the plate which connects it with the hub. Neither do I claim making the hub in two pieces; but

What I claim as my invention and desire to secure by Letters Patent, is—

Binding the groove ($a$), with a shoulder ($b$), of greater depth than the shoulder ($c$), which binds the other side of the groove ($a$), so that a support and guide for the central plate D, will be provided during the shrinkage of the tire upon the plate, as herein set forth and described.

CHARLES F. BROWN.

Witnesses:
ALFRED BOSWORTH,
DANIEL BOSWORTH.